Figure 1:
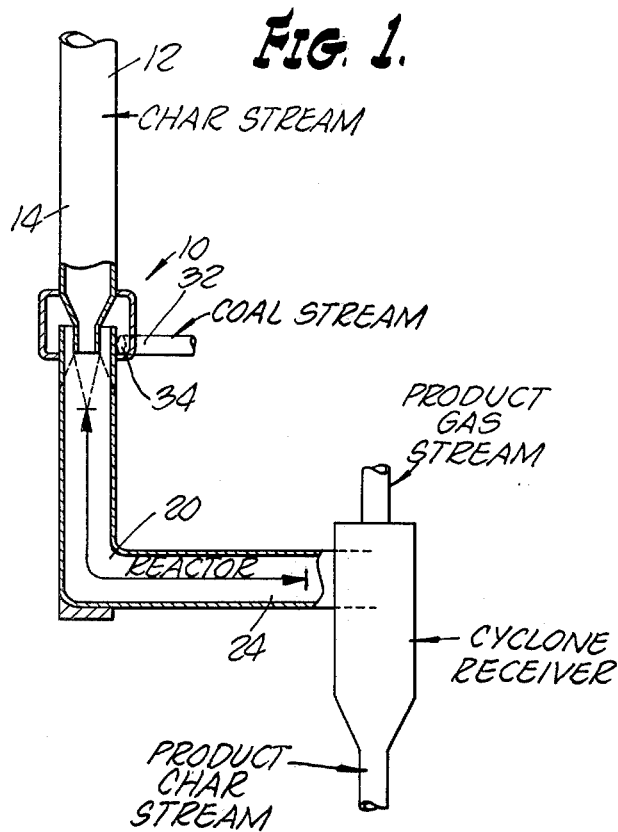

United States Patent [19]

Green

[11] 4,163,693
[45] Aug. 7, 1979

[54] FLUIDIZING A MIXTURE OF PARTICULATE COAL AND CHAR

[75] Inventor: Norman W. Green, Pomona, Calif.

[73] Assignee: Occidental Petroleum Corporation, Los Angeles, Calif.

[21] Appl. No.: 633,898

[22] Filed: Nov. 20, 1975

Related U.S. Application Data

[63] Continuation of Ser. No. 449,073, Mar. 7, 1974, abandoned.

[51] Int. Cl.² .............................................. C10B 1/00
[52] U.S. Cl. ...................................... 201/22; 201/31; 34/57 A; 202/117
[58] Field of Search ...................... 201/10, 12, 21, 22, 201/24, 28, 31, 32; 202/99, 108, 120, 121, 117; 48/206, 207; 23/288 S; 159/16 S; 34/57 R, 57 A, 57 B, 57 E; 302/51, 57, 30, 64

[56] References Cited

U.S. PATENT DOCUMENTS

| | | | |
|---|---|---|---|
| 2,177,664 | 10/1939 | Lee | 159/16 S |
| 2,483,426 | 10/1949 | Moore | 159/16 S |
| 2,534,051 | 12/1950 | Nelson | 201/31 X |
| 2,726,136 | 12/1955 | Davis, Jr. | 23/288 S |
| 2,750,330 | 6/1956 | Nelson | 201/28 |
| 2,879,148 | 3/1959 | Atwell | 48/206 |
| 2,935,466 | 5/1960 | Schoenmakers | 208/176 |
| 2,955,988 | 10/1960 | Sebastian | 201/31 X |
| 3,145,076 | 8/1964 | Reichert et al. | 48/206 |
| 3,455,789 | 7/1969 | Landers | 201/31 |
| 3,597,347 | 8/1971 | Ellington | 201/20 |
| 3,655,518 | 4/1972 | Schmalfeld et al. | 202/108 |
| 3,736,233 | 5/1973 | Sass et al. | 201/22 X |
| 3,816,338 | 6/1974 | Corson | 202/121 |

*Primary Examiner*—Norman Yudkoff
*Attorney, Agent, or Firm*—Forrest E. Logan

[57] ABSTRACT

Method of mixing particulate materials comprising contacting a primary source and a secondary source thereof whereby resulting mixture ensues; preferably at least one of the two sources has enough motion to insure good mixing and the particulate materials may be heat treated if desired.

Apparatus for such mixing comprising an inlet for a primary source, a reactor communicating therewith, a feeding means for supplying a secondary source to the reactor, and an inlet for the secondary source. Feeding means is preferably adapted to supply fluidized materials.

11 Claims, 4 Drawing Figures

FLUIDIZING A MIXTURE OF PARTICULATE COAL AND CHAR

The Government has rights in or in respect of this invention pursuant to Contract No. E(49-18)-2244 awarded by the U.S. Energy Research and Development Administration.

This is a continuation of application Ser. No. 449,073, filed Mar. 7, 1974, now abandoned.

The present invention relates to a new and novel method and apparatus for mixing particulate materials. More particularly, the invention relates to such a method and apparatus for the mixing of fluid media containing particulate materials dispersed therein. Still more particularly, the invention relates to such a method and apparatus in which certain chemical and/or physical reactions result from such mixing, and in which certain useful products result. Even more particularly, the invention relates to such a method and apparatus which is continuous.

Coaxial fluid jet streams have been used in the past to promote the turbulent mixing thereof for the purpose of producing a well integrated combustable mixture. Combustable mixtures have also resulted from the introduction of a primary jet stream of a particle laden material into a secondary air stream. Such stream mixing has not been applied to mixing streams, each containing fine particulate material, nor has it been used as a method to transfer thermal energy between the streams.

Multiple nozzle systems for contacting multiple jet streams in order to promote the mixing thereof usually result in a high degree of abrasion in the apparatus employed because high velocities are required as a rule; such systems are also characterized by a high pressure drop in the apparatus which causes lesser efficiency in the operation thereof.

Prior methods of mixing particulate materials have not been as rapid or as thorough as might be the case. Literature relating to prior art mixing applications is found
1. Perry, R. H., et al, *Chemical Engineers Handbook*, McGraw Hill (1963) page 5–18.
2. Hill, B. J., J. Fluid Mech., 51(4) pp. 773–779 (1972).
3. Tufts, L. W., and Smoot, L. D., J. Spacecraft, 8(12) pp. 1183–1190 (1971).

It is therefore an object of the present invention to provide a new and novel apparatus and method of mixing particulate materials.

Another object of the present invention is to provide apparatus and method of such types which involves contacting a source of particulate materials of a selected type with a second source of particulate materials of another selected type.

Still another object of the present invention is to provide apparatus and method of such types in which certain of the particulate materials are first preheated before use, whereby thermal energy is transferred to the other particulate materials in the method, upon contact.

Yet another object of the present invention is to provide apparatus and method for mixing particulate materials which appreciably reduce the degree of abrasion in apparatus encountered normally in the prior art.

A further object of the present invention is to provide apparatus and method of the aforementioned types which significantly reduce the amount of pressure drop normally encountered in the prior art.

Still a further object of the present invention is to provide apparatus and method of the aforementioned types which are more efficient than those of the prior art.

Yet a further object of the present invention is to provide apparatus and method of the aforementioned types which are faster and more thorough than those of the prior art.

Figure 2:
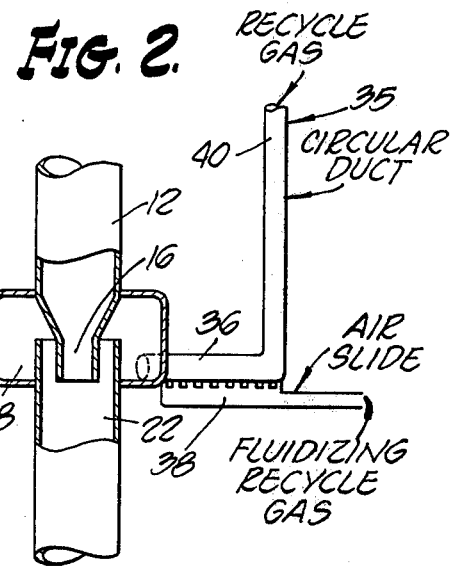
Figure 3:
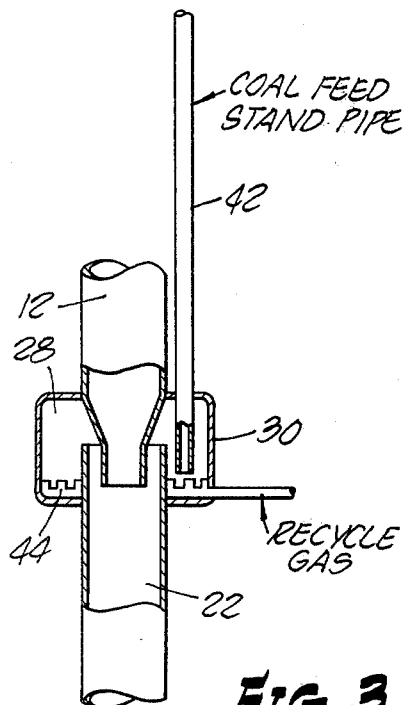
Figure 4:
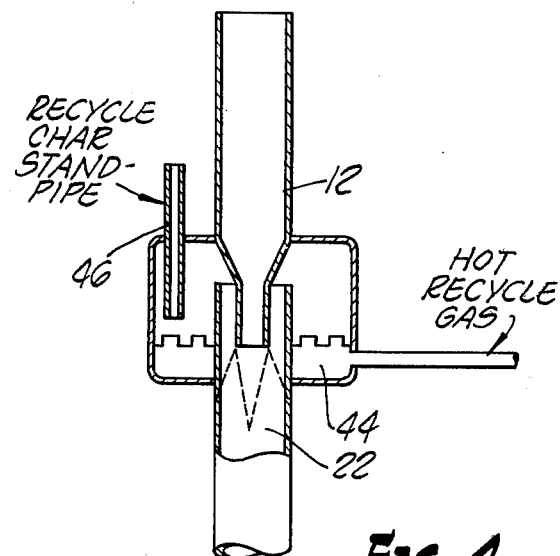

Other objects and advantages of the present invention will become apparent from a consideration of the following detailed portion of the specification taken in conjunction with the appended drawing, in which:

FIG. 1 is an elevational view, partly in section, of apparatus incorporating one embodiment of the present invention; and FIG. 2 is a view like FIG. 1 but incorporating another embodiment of the present invention; and FIG. 3 is a view like FIG. 2 but incorporating still another embodiment of the present invention; and FIG. 4 is a view like FIG. 3 but incorporating yet another embodiment of the present invention.

The present inventive method of mixing essentially involves the step of contacting a primary source of particulate materials and a secondary source of particulate materials, whereby a resulting mixture ensues. Preferably the materials are then allowed to stay in contact sufficiently long enough for a desired chemical and/or physical reaction to proceed appreciably. Then preferably, desired reaction products are removed from the resulting mixture of particulate materials.

The secondary source may be non-moving or moving, preferably relatively stagnant or slow-moving with respect to the primary source which preferably has more motion. The only requirement is that when the two sources are brought together, there be sufficient total motion from both sources to insure good enough mixing of the particulate materials to be able to detect an appreciable degree of the desired chemical and/or physical change. Preferably, the primary source is given considerable motion and most of the mixing done thereby, while the secondary source gets little.

The secondary source of particulate materials may be any conventional one, but preferably is an inert fluid medium in which the particulate materials are dispersed; more preferably the materials are uniformly dispersed in the medium. More preferably, the fluid medium is a gaseous one and may include a mixture of gases if desired.

The particular particulate materials present in the secondary source may be any which are desired to be brought into contact with the primary source. In many applications, the particular particulate material is preferably coal and/or coal chars.

The particulate materials which are preferably dispersed in a fluid medium to form the secondary source may be dispersed by conventional means, entrainment for example, but are preferably dispersed by means of fluidizing the particulate materials, preferably by the gas injection thereof or by treatment in a fluidizing chamber.

The secondary source of particulate materials preferably takes the form of a slow moving stream or entrained stream in comparison with the primary source of particulate materials which is preferably a fast moving stream or entraining stream. Contact of the two streams produces a resulting mixture, a stream also preferably.

The primary source of particulate materials may be conventional but preferably is a fluid medium containing the materials; more preferably, the medium is gaseous and may include mixtures of gases if desired. Even more preferably, the medium is steam or an inert gas mixture. The particulate materials are preferably dispersed throughout the medium; more preferably, the particulate materials are preferably dispersed uniformly throughout the medium.

The particular particulate materials present in the primary source thereof may be any having suitable properties. In many applications, the materials are preferably the char resulting from the pyrolysis of coal or coal itself.

The particulate materials present in the primary source and preferably dispersed uniformly therein may be so dispersed by any conventional means but preferably are dispersed by means of imparting turbulent flow to the source by pressurizing it sufficiently and giving it direction. Considerable motion is also imparted to the primary source as a result which is useful for contacting the secondary source of particulate materials later on.

The particulate materials of the present method may be heat treated as an additional step if desired; either the primary or the secondary source thereof or both sources may be heat treated before or after contacting them together if desired. In many applications, the primary source is preferably preheated before contact in order that the thermal energy thereof be imparted to the secondary source of particulate materials upon contact. More preferably, recycled char from the pyrolysis of coal is used to heat the primary source. Additional treatment heat may be supplied to the resulting mixture from the contact of the primary and secondary sources, if desired.

The resulting mixture, preferably a stream, from the contact of the primary source and the secondary source contains a mixture of particulate materials dispersed therein which will react physically and/or chemically, given sufficient time. The materials in the mixture are preferably dispersed throughout, more preferably uniformly dispersed throughout the mixture, preferably by means of imparting a turbulent flow thereto by sufficient pressurization and by giving it direction. More preferably, the primary source is made turbulent enough initially to impart turbulence to the resulting mixture after contacting the secondary source of particulate materials.

After the desired reaction has taken place, desired products are separated from the resulting mixture. Volatile products may be taken off directly, resulting char may be recycled back to the present primary source for reuse in the method, and some gas taken off and recycled back to the secondary source of particulate materials for use in fluidizing them.

The present inventive apparatus is directed to a mixing section for mixing particulate materials which has a first inlet, preferably generally vertically disposed, for admitting a primary source of particulate materials or entraining stream. The first inlet has an end which terminates within the mixing section which is preferably constricted to form a nozzle for increasing the velocity of the stream as it passes therethrough, the nozzle preferably being refractory-lined.

The mixing section also has a reactor which communicates with the aforementioned end of the first inlet to receive the entraining stream therefrom and also communicates with a cyclone receiver which separates gaseous and solid products from the resulting mixture after reaction has taken place.

The mixing section further has feeding means for receiving and feeding an incoming secondary source of particulate materials or entrained stream to the entraining stream coming in through the first inlet. The feeding means communicates with the reactor, providing access for a supply of particulate materials. The entrained stream may enter the feeding means from any direction or angle as long as the materials introduced can work their way into the reactor.

The feeding means is preferably a fluidizing means for fluidizing the incoming particulate materials. Preferably, the fluidizing means is a fluidizing chamber adapted for such purposes. In some applications, the chamber is adapted to fluidize the incoming materials by imparting sufficient motion thereto. More preferably the chamber is annular and adapted to impart such motion as a result. The direction or angle at which the entrained stream comes into the chamber may also be adapted to help impart such motion thereto as may be the location of the point of entry of the stream into the chamber and the velocity thereof.

In certain applications, the entrained stream comes into an annular chamber at a lower portion thereof and generally horizontally thereto the chamber being so adapted; more preferably, the stream comes in tangentially to the chamber which is suitably adapted and a swirling motion is imparted as a result.

In other applications the fluidizing chamber is adapted for fluidizing by virtue of having injection means provided therewith. The injection means provides apparatus for the injection of particulate materials by fluid, preferably gas, and preferably takes the form of a porous bed or plate which is adapted to operate on gas, preferably recycle gas from the method; the porous bed or plate allows some gas to get through it when pressurized sufficiently which gas does the injecting. Particulate materials coming into the chamber are thus fluidized.

The injection means provided for the fluidizing chamber is preferably positioned inside the chamber and more preferably at the bottom thereof. The particulate materials coming into the chamber may be introduced from any direction or angle but are preferably introduced generally vertically from above.

The mixing section still further has a second inlet for receiving a secondary source of particulate materials or entrained stream; the second inlet is connected to the feeding means, preferably generally horizontally at a lower portion thereof. More preferably the feeding means is annular and the second inlet is connected tangentially thereto.

In some applications, the second inlet is provided with additional fluidizing means for fluidizing the particulate materials prior to entry into the feeding chamber. The additional fluidizing means are preferably additional injection means and preferably an air slide connected to the second inlet whereby particulate materials moving through the inlet are injected by air from the slide. More preferably, the air slide is adapted to operate on recycle gas from the method.

In other applications, the second inlet is preferably connected substantially vertically to the feeding means.

Turning now to the drawing, the first three Figs. are directed to a secondary source of particulate materials which is coal and to a primary source of particulate materials which is char resulting from the pyrolysis of coal dispersed in stream; FIG. 4 is directed to a secondary source of particulate material which is char resulting from the pyrolysis of coal dispersed in steam and the primary source of particulate materials is coal.

In FIG. 1, the char stream comes rapidly enough into the mixing section, generally designated 10, through a generally upright annular first inlet 12 which has an end 14 terminating within the section and constricted at 16 to form a nozzle, so that a fluid jet is formed thereby. A reactor 20 also annular, has an upper end 22 which is open and of larger diameter than the nozzle which surrounds the nozzle, leaving an opening between the upper end and the nozzle. The reactor has an elbow in the middle which rests upon a support and has a lower end 24 connected to a cyclone receiver for separating gaseous from solid products. An annular fluidizing chamber 28 is formed by an annular section 30 which connects the first inlet and the upper end 22 of the reactor, the chamber surrounding the nozzle and a portion of the upper end of the reactor. A second annular inlet 32 is generally horizontally connected to the annular fluidizing chamber at a low portion 34 thereof for receiving a stream of coal dispersed in air, the inlet also being tangentially positioned with respect to the annular chamber wall to impart a swirl to the incoming stream. Incoming coal builds up in the fluidizing chamber 28 and is expelled over the upper end 22 of the reactor, through the opening between the upper end thereof and the nozzle, into the reactor itself. Once inside the reactor, the coal soon falls into the path of the turbulent fluid jet of the char stream coming from the nozzle, where it is acted upon by the jet as shown by broken lines. Once inside the reactor, the jet has a free core region extending considerably into the reactor but expansion of the jet also occurs which entrains coal present, with complete mixing of the coal and the jet later on.

In FIG. 2, the apparatus is the same as that in FIG. 1 except that the second annular inlet is different. The inlet 35 has a generally horizontal portion 36 like second inlet 32 and adapted to receive an air slide 38 and being so equipped; the air slide is preferably adapted to operate on recycle gas instead of air. The inlet also has a generally upright portion 40 communicating with the horizontal portion 36 through which coal is introduced. Coal so vertically introduced is fluidized by injected gas from the slide before its introduction into the fluidizing chamber.

In FIG. 3 the apparatus is the same as in FIG. 2 except that the second annular inlet 42 for introducing coal comes generally vertically instead of horizontally into the fluidizing chamber and in that a porous bed or plate 44 has been provided at the bottom of the chamber and connected to a source of recycle gas and adapted to operate thereon in order to fluidize such incoming coal by injecting the coal with gas.

In FIG. 4, the apparatus is similar to that of FIG. 3, except that the coal stream is introduced through the first inlet instead of the char stream, the char stream being introduced generally vertically instead to the fluidizing chamber from an upright second inlet 46. The flow paths of the char and coal streams are in FIG. 4 exactly the opposite of what they are in FIG. 3. The coal stream in FIG. 4 is introduced rapidly enough to form a jet stream which acts upon the char stream as shown by the broken lines, like in FIG. 1.

In practice, a hot char recycle stream is fed to the mixing section shown in FIG. 1 through a seven-foot diameter vertical first inlet. The char stream velocity is 20 feet per second in the inlet but is increased to 94 feet per second by passing through a nozzle 39 inches in diameter and positioned at the end of the inlet inside the mixing section.

Feed coal is pneumatically conveyed by recycle gas to the mixing section in a 5 inch diameter generally horizontal second inlet. The coal is then discharged tangentially into a low portion of the annular fluidizing chamber and fluidized thereby.

The coal is then expelled over the outer wall of the reactor and through the open end thereof, through the opening between the open end of the reactor and the nozzle and then into the inside of the reactor where it falls into the path of the char stream jet coming from the nozzle which is turbulent. The reactor is annular and has the same diameter as the first inlet.

Fluidized coal in the reactor is entrained by the turbulent jet which expands once inside the reactor.

About ten feet of reactor length is required for such entrainment and another six feet is required for the jet to disappear and the two streams to mix completely. About 0.5 to 0.6 seconds is required for complete mixing.

The resulting mixture stream leaves the reactor at a velocity of 21 feet per second. The jet from the nozzle is maintained at turbulent flow by having a Reynolds number of 100,000. The resulting mixture stream is also maintained at turbulent flow by having a Reynolds number of 220,000.

Other details of the apparatus and method are tabulated below:

|  | Char Recycle | Coal Feed | Product Gas | Product Chart |
|---|---|---|---|---|
| Solids rate pounds/hour | 14,300,000 | 860,737 | — | 14,760,659 |
| Gas rate, pound/hour | 134,794 | 10,000 | 603,502 | — |
| Temperature, Degrees Fahrenheit | 1,789 | 145 | 1,600 | 1,600 |
| Pressure, pounds/sq. inch. absolute | 64 | 66 | 62 | 62 |
| Gas Molecular Weight | 18 | 31.5 | 27 | — |

Some materials exhibit a plastic or tacky state when heated sufficiently which could plug the present mixing apparatus if used therein. For example, some coals exhibit this property but will lose their tackiness upon being heated sufficiently additionally; tackiness is thus a transitory state which can be overcome with sufficient heat.

Particulate materials exhibiting such tackiness can be used in the present apparatus without fear of plugging if they are heat treated sufficiently, either before or during the present method. That is, if sufficient heat is applied to the particulate materials, the tacky state is gone through rapidly enough to avoid the problem. Preferably, the primary or entraining stream of particulate materials is heated sufficiently during the contacting of the secondary or entrained stream to transfer sufficient heat to get such materials in the former stream through the tacky state rapidly enough after mixing to avoid the plugging problem.

For example, some Eastern coals exhibit the property of tackiness when first heated, but the tackiness disappears with additional heating.

Particulate material going to the reactor from the feeding means may be entrained rather than fluidized but the present apparatus and method would not be as efficient in operation. Such particulate material is preferably not introduced to the reactor at very high velocity because it would require too high a velocity of the entraining stream otherwise.

The mixing time of the present process is dependent upon the geometry of the apparatus and the flow conditions of the streams. It is desirable to minimize such time.

The entraining stream or primary source of particulate materials from the first inlet is preferably always turbulent and is assigned an appropriate Reynolds number to insure this condition. The entrained stream or secondary source of particulate materials from the second inlet is preferably always maintained at a rate of flow much less than turbulent. The resulting mixture stream from the contacting of the entraining and the entrained streams is preferably always turbulent also and is maintained at an appropriate Reynolds number to accomplish the result. The relatively fast moving entraining stream thus preferably picks up the relatively slow moving entrained stream, comparing the two streams together, to form a resulting mixture stream which is still fairly fast moving in comparison with the entraining stream.

The nozzle which is preferably refractory-lined may be lined with any conventional material such as a variety of annealed stainless steel, inconel, cast steels, and the like.

In operation, an acceptable fluid velocity to the cyclone receiver is first selected and this velocity is chosen also for the resulting mixture stream in the reactor. Once the reactor velocity is selected, then the velocity of the entraining stream through the end, preferably constricted to form a nozzle, of the first inlet is picked to be substantially higher than the reactor velocity. Then the velocity of the entrained stream is selected to provide secondary particulate materials to the reactor at a lower velocity than the resulting mixture stream.

The velocity of the entraining stream above the nozzle does not matter nor does the diameter of the first inlet as long as it is larger than that required for entraining the primary particulate materials. The nozzle velocity must be substantially greater than the inlet velocity however.

The diameter of the nozzle does not matter as long as it is substantially less than the inlet diameter, in order that the velocity of the entraining stream be stepped up sufficiently to operate properly.

The diameter of the reactor does not matter as long as it is significantly greater than the nozzle diameter, so as to permit proper expansion of the jet coming into the reactor from the nozzle. The nozzle velocity of the entraining stream entering the reactor must be greater than that of the resulting mixture stream, however, in order to have flow through the reactor.

It will be apparent to those skilled in the art that all the objects and advantages previously set forth for the present invention have been accomplished.

It is to be understood that only the preferred embodiments of the present invention have been set out and described in detail herein and that the invention may be practiced otherwise than as specifically set forth and described and within the scope of the appended claims.

What is claimed is:

1. A process for mixing particulate coal and heated particulate coal char comprising:
   a. introducing a particulate coal downwardly and in turbulent flow into a mixing zone;
   b. simultaneously and separately fluidizing a heated particulate coal char in a fluidizing zone with a fluidizing fluid and causing said heated particulate coal char to flow upwardly while being suspended in said fluidizing fluid and causing said heated particulate coal char to overflow a weir means within said fluidizing zone while in the fluidized state and to pass from said fluidizing zone to said mixing zone;
   c. introducing said heated particulate coal char into said mixing zone substantially completely around said particulate coal as said particulate coal is first introduced into said mixing zone; and
   d. mixing said particulate coal and said heated particulate coal char in said mixing zone.

2. The process of claim 1 wherein said coal is a type which exhibits a plastic or tacky state when heated sufficiently.

3. A process for mixing particulate coal and heated particulate coal char comprising:
   a. introducing a heated particulate coal char downwardly and in turbulent flow into a mixing zone;
   b. simultaneously and separately fluidizing a particulate coal in a fluidizing zone with a fluidizing fluid and causing said particulate coal to flow upwardly while being suspended in said fluidizing fluid and causing said particulate coal to overflow a weir means within said fluidizing zone while in the fluidized state and to pass from said fluidizing zone to said mixing zone;
   c. introducing said particulate coal into said mixing zone substantially completely around said heated particulate coal char as said particulate coal is first introduced into said mixing zone; and
   d. mixing said heated particulate coal char and said particulate coal in said mixing zone.

4. A process for mixing particulate coal and heated particulate coal char comprising:
   a. introducing a particulate coal downwardly and in turbulent flow into a flow-through mixing zone, said flow-through mixing zone having an inlet boundary through which said particulate coal is introduced;
   b. simultaneously and separately fluidizing a heated particulate coal char in a fluidizing zone with a fluidizing fluid and causing said heated particulate coal char to flow upwardly while being suspended in said fluidizing fluid and causing said heated particulate coal char to overflow a weir means within said fluidizing zone while in the fluidized state and to pass from said fluidizing zone to said flow-through mixing zone;
   c. introducing said heated particulate coal char into said flow-through mixing zone through and substantially completely around said inlet boundary of said flow-through mixing zone; and
   d. mixing said particulate coal and said heated particulate coal char in said flow-through mixing zone.

5. The process of claim 4 wherein said coal is a type which exhibits a plastic or tacky state when heated sufficiently.

6. A process for mixing particulate coal and heated particulate coal char comprising:
   a. introducing a heated particulate coal char downwardly and in turbulent flow into a flow-through mixing zone, said flow-through mixing zone having an inlet boundary through which said heated particulate coal char is introduced;
   b. simultaneously and separately fluidizing a particulate coal in a fluidizing zone with a fluidizing fluid and causing said particulate coal to flow upwardly while being suspended in said fluidizing fluid and causing said particulate coal to overflow a weir means within said fluidizing zone while in the fluidized state and to pass from said fluidizing zone to said flow-through mixing zone;
   c. introducing said particulate coal into said flow-through mixing zone through and substantially completely around said inlet boundary of said flow-through mixing zone; and
   d. mixing said heated particulate coal char and said particulate coal in said flow-through mixing zone.

7. A process for mixing particulate coal and heated particulate coal char comprising:
   a. introducing a particulate coal downwardly and substantially centrally and in turbulent flow into a flow-through conduit reactor having a substantially vertically inclined and substantially completely open-ended inlet;
   b. simultaneously and continuously fluidizing a heated particulate coal char in a fluidizing chamber which surrounds said inlet of said conduit reactor and which contains a weir means formed by said inlet of said conduit reactor and said fluidizing chamber, with a fluidizing gas and causing said heated particulate coal char to flow upwardly while being suspended in said fluidizing gas and causing said heated particulate coal char to overflow said weir means and to enter said inlet of said reactor completely around said particulate coal as said particulate coal enters said inlet of said reactor; and
   c. mixing said particulate coal and said heated particulate coal char.

8. The process of claim 7 wherein said coal is a type which exhibits a plastic or tacky state when heated sufficiently.

9. The process of claim 8 further comprising entraining said particulate coal in a gas stream before introducing it into said conduit reactor.

10. A process for mixing particulate coal and particulate coal char comprising:
   a. introducing a heated particulate coal char downwardly and in turbulent flow into a flow-through conduit reactor having a substantially vertically inclined and substantially completely open-ended inlet;
   b. simultaneously and continuously fluidizing a particulate coal in a fluidizing chamber which surrounds said inlet of said conduit reactor and which contains a weir means formed by said inlet of said conduit reactor and said fluidizing chamber, with a fluidizing gas and causing said particulate coal to flow upwardly while being suspended in said fluidizing gas and causing said particulate coal to overflow said weir means and to enter said inlet of said reactor completely around said heated particulate coal char as said heated particulate coal char enters said inlet of said reactor; and
   c. mixing said heated particulate coal char and said particulate coal.

11. The process of claim 10 further comprising entraining said heated coal char in a gas stream before introducing said heated coal char into said conduit reactor.

UNITED STATES PATENT AND TRADEMARK OFFICE
CERTIFICATE OF CORRECTION

PATENT NO. : 4,163,693
DATED : Aug. 7, 1979
INVENTOR(S) : Norman W. Green

It is certified that error appears in the above-identified patent and that said Letters Patent are hereby corrected as shown below:

Column 6, line 35, for the column heading "Product Chart" read --Product Char--.

Signed and Sealed this

Nineteenth Day of February 1980

[SEAL]

Attest:

SIDNEY A. DIAMOND

Attesting Officer    Commissioner of Patents and Trademarks